United States Patent [19]

Bochman, Jr. et al.

[11] 3,942,570

[45] *Mar. 9, 1976

[54] MECHANISM FOR SECURING A NUT AGAINST LOOSENING

[75] Inventors: Harry L. Bochman, Jr., Seal Beach; George S. Wing, Palos Verdes Estates, both of Calif.

[73] Assignee: Hi-Shear Corporation, Torrance, Calif. ; a part interest

[ * ] Notice: The portion of the term of this patent subsequent to Dec. 3, 1991, has been disclaimed.

[22] Filed: Nov. 15, 1974

[21] Appl. No.: 524,224

Related U.S. Application Data

[63] Continuation-in-part of Ser. No. 400,215, Sept. 24, 1973, Pat. No. 3,851,690.

[52] U.S. Cl. .................................... 151/8; 285/81
[51] Int. Cl.² .................................... F16B 39/02
[58] Field of Search ............... 151/8, 28, 29, 54, 44, 151/2 R; 285/81

[56] References Cited
UNITED STATES PATENTS

| | | | |
|---|---|---|---|
| 1,189,656 | 7/1916 | Bohle | 151/2 R |
| 3,851,690 | 12/1974 | Wing et al. | 151/8 |

*Primary Examiner*—Marion Parsons, Jr.
*Attorney, Agent, or Firm*—Donald D. Mon; D. Gordon Angus

[57] ABSTRACT

There are disclosed nut locking assemblies comprising a washer adapted to slide over a spindle and be keyed to it, and a lock-ring to the rear of the washer and secured to the washer against relative rotation. The nut abuts the washer. The lock-ring is slidable axially so that in a forward position it is disengaged from the nut but in a rearward position serrations on the lock-ring engage corresponding serrations on the nut to lock the nut against rotation. An annular space between the washer and the lock-ring contains a resilient ring which can be strained to alter its diameter. In its normal unstrained condition this ring holds the lock-ring in its locking position. When it is desired to move the lock-ring to its unlocked position it is pushed forward to disengage the serrations of the lock-ring from those of the nut. This strains the resilient ring to a different diameter so that when the pressure is removed from the resilient ring it resumes its original unstrained diameter to push the lock-ring back into engagement with the nut, thereby locking it against rotation.

17 Claims, 16 Drawing Figures

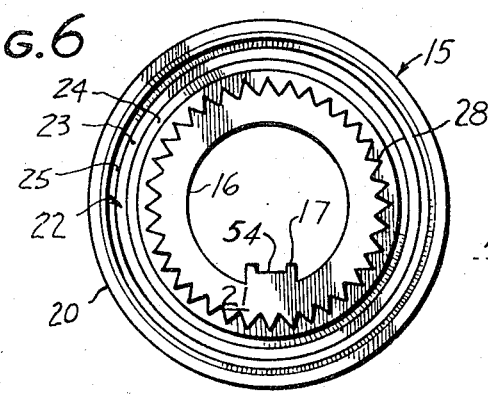
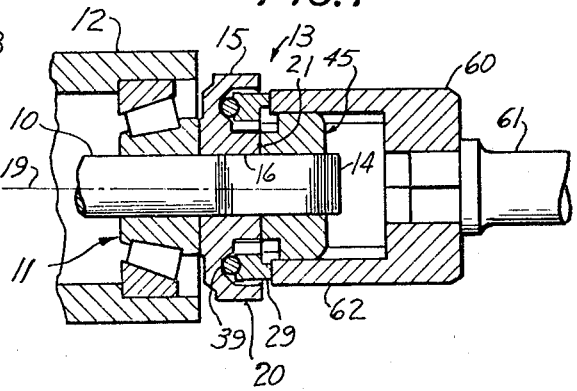
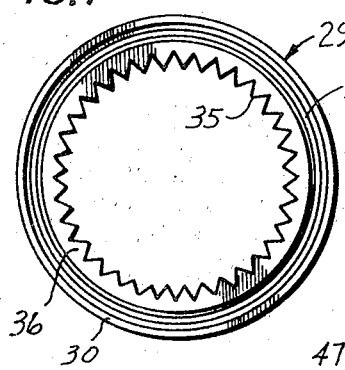
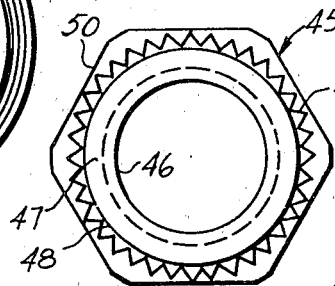
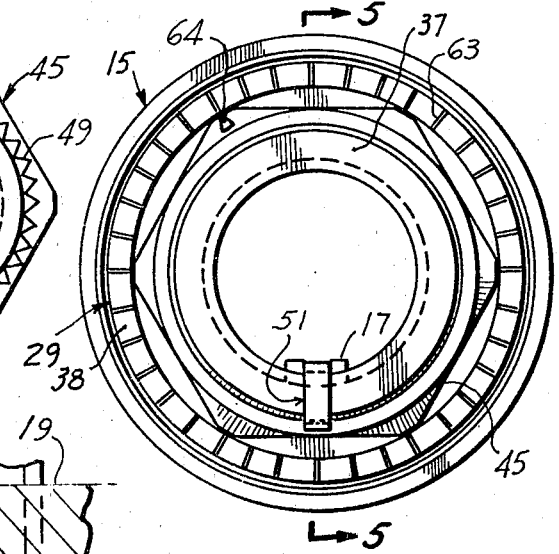
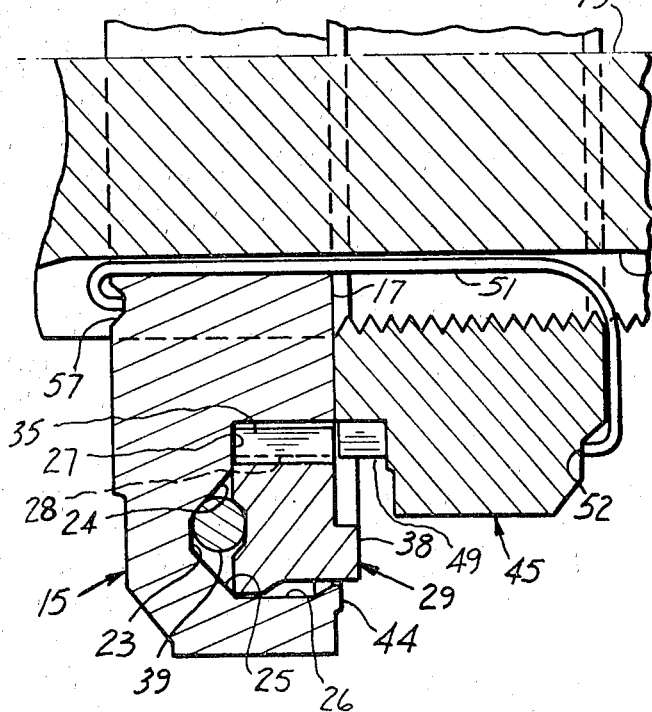
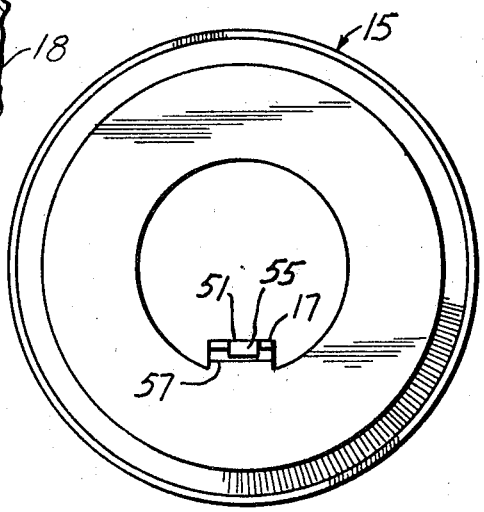

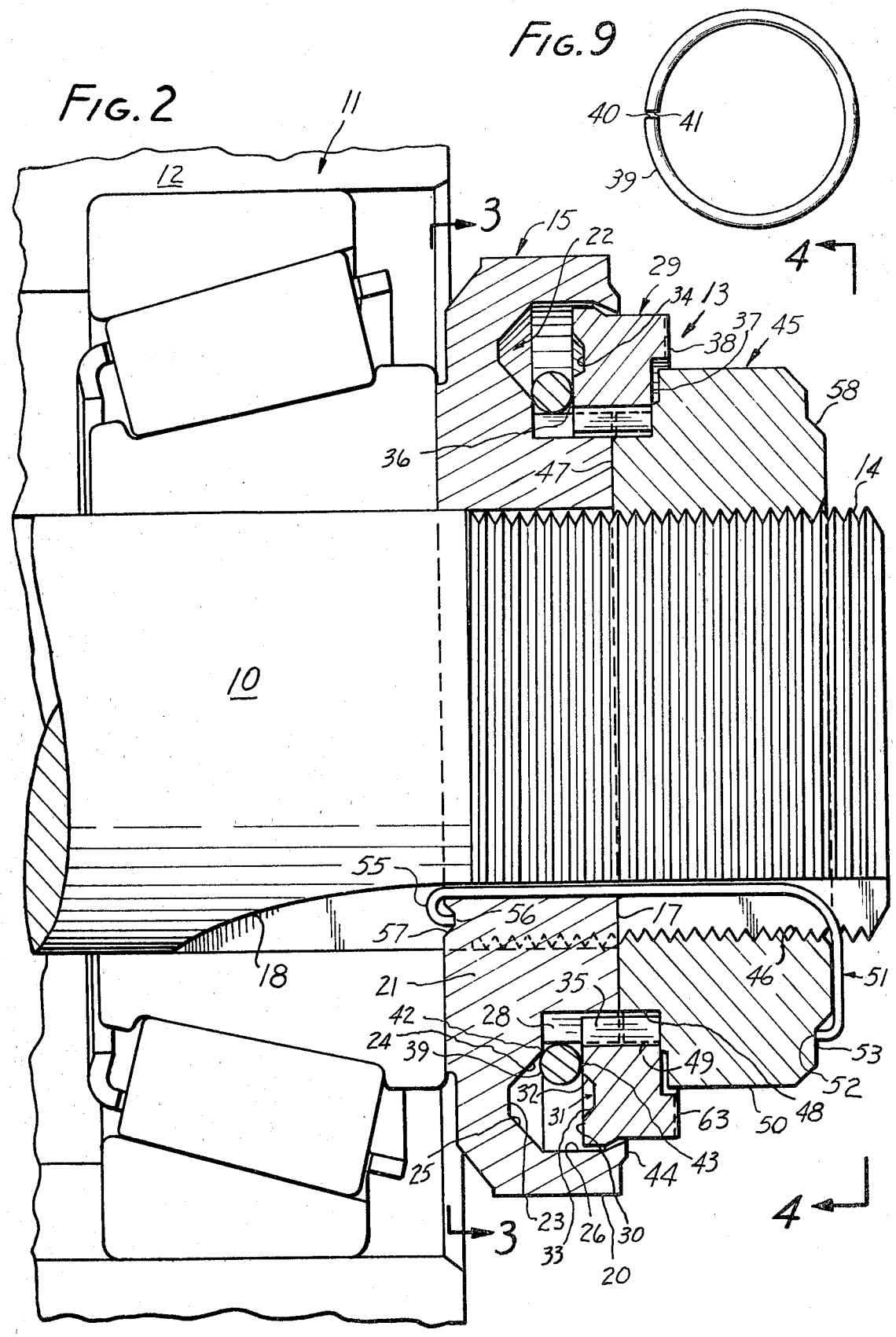

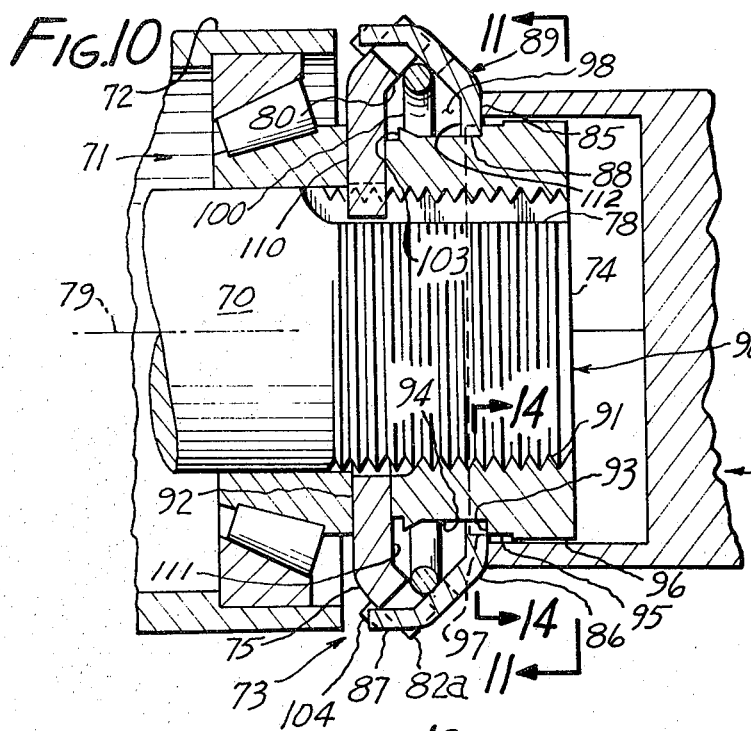
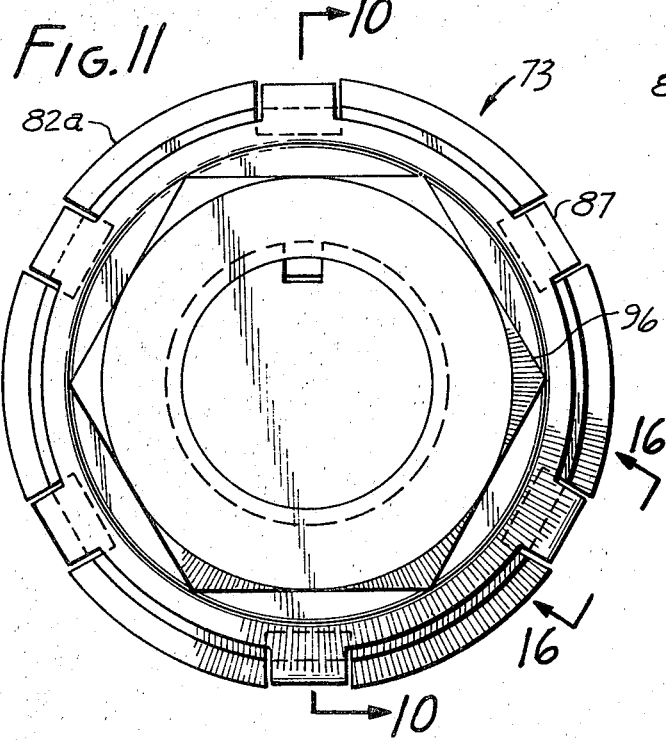
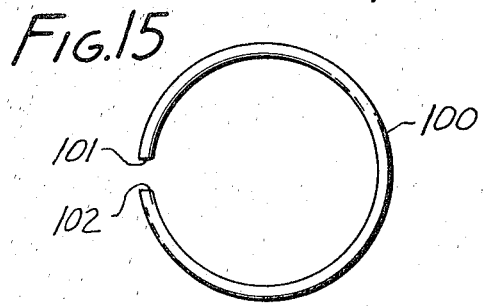
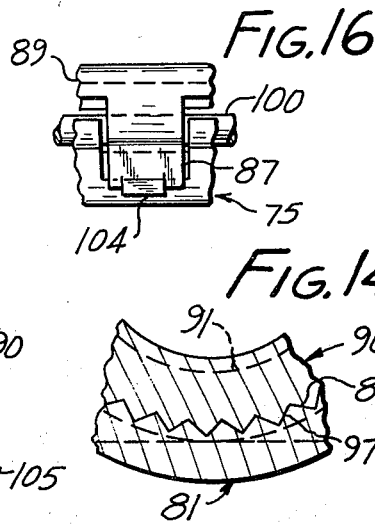
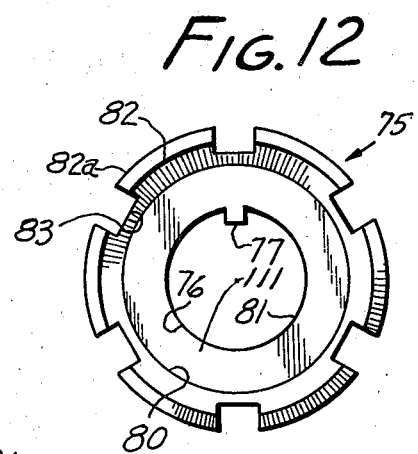
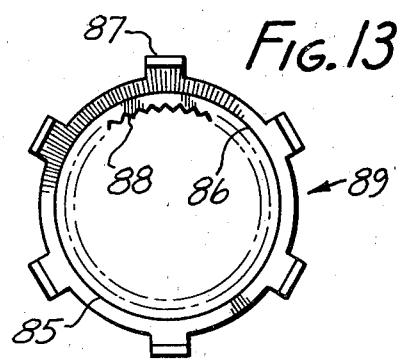

MECHANISM FOR SECURING A NUT AGAINST LOOSENING

This is a continuation-in-part of application Ser. No. 400,215, filed Sept. 24, 1973, entitled "Mechanism for Securing a Nut against Loosening" now Pat. No. 3,851,690.

This invention relates to means for preventing loosening of a nut, and more particularly to means by which the nut is locked in its tightened position on the spindle.

It is well-known that wheels such as automobile wheels are provided with bearings mounted on a spindle threaded to receive a nut which is torqued on the spindle to hold the bearing in its proper position. Care must be exercised in such practice to insure that the nut will not loosen during use and the vibrations and shocks to which the wheels are subjected in use, otherwise the wheel will not function properly and may even fall off if the nut falls off.

Expedients, such as the use of cotter pins through the spindle behind the nut or through the nut have been used. The use of cotter pins or other pins, or wires, or the like have disadvantages such as the need for precise positioning of the pin hole or holes through the spindle and the risk of weaknesses developing in the pin or wire which may result in its damage or destruction, and thereby enabling the nut to loosen.

Another expedient has been the use of well-known lock washers in front of the nut which create a frictional resistance against loosening of the nut. Such frictional devices are not positive, however, and do not eliminate the possibility of loosening of the nut.

In Greenwood Pat. 3,581,609 issued June 1, 1971, there is disclosed a nut locking arrangement wherein the nut is provided with an annular recess extending into the nut from its rear face and a ring member within the recess provided with a key which fits into a keyway of a bolt on which the nut is to be fitted. The outer periphery of the ring member is provided with outwardly protruding serrations adapted to mesh with serrations which protrude inwardly from the rear of the peripheral portion of the nut. A leaf spring device located at the base of the recess of the nut serves to urge the ring member rearwardly so that its serrations normally mesh with those of the nut and thereby lock the nut in position relative to the bolt. When it is desired to turn the nut on the bolt a special wrench tool is used to depress the ring member against the force of the leaf spring to disengage its serrations from those of the nut. Removal of the tool thereby causes the ring member to again engage and lock the nut. This arrangement is effective so long as the leaf spring member retains its integrity and spring quality; as it must continually exert a pressure against the ring member in order to maintain the nut locked. If the spring becomes damaged or loses its resilience over a period of time, or through shocks during usage, the ring member could disengage from the nut, allowing the nut to loosen.

An object of the present invention is to provide a mechanism for locking a nut to a spindle which provides a more positive locking than previously known arrangements.

A related object is to provide nut locking mechanism which is foolproof and a resilient member used therein is strong and at a state of rest when the nut is locked and will not fail.

Another object is to provide means which facilitates the locking action and facilitates returning the nut to an original desired position after it has been removed from a part it is holding.

In accordance with the present invention, there is provided means and mechanism which, though making use of a form of spring member as an element uses a form of resilient member which is inherently much stronger than can be used in the Greenwood assembly and which is normally at a position of rest when the nut is in a locked position, and furthermore, the occurrence of shocks and vibration does not materially exert any stress or strain of the resilient spring member. The principal stress and strain of the spring member occurs while torquing the nut and so long as it does not fail under such torquing it will not fail after the nut is locked.

The present invention is carried out by an assembly of a washer, an annular ring member or lock-ring, the nut and a resiliently expandable and contractable ring. The washer is provided with means for keying it to the spindle against rotation but is axially slidable forwardly and rearwardly on the spindle. The washer is also provided with engaging means by which it is engaged to the lock-ring to prevent relative rotation between the washer and lock-ring. The lock-ring is to the rear of the washer and is provided with engaging means by which it engages the washer. The threaded nut has a forward portion adapted to abut the washer when the nut is threaded forwardly over the spindle and is provided with means for engaging the lock-ring. The portion of the nut to the rear of its forward portion is engageable by a wrench.

Between the lock-ring and the washer there is an annular space within which there is placed the resiliently strainable ring. Forward pressure against the lock-ring causes it to slide forwardly relative to the spindle so that it becomes disengaged from the nut, thereby allowing the nut to be turned on the spindle. This forward sliding motion operates on the resilient ring to strainably alter its diameter so that when the pressure on the lock-ring is discontinued the resiliently strained ring returns to its original unstrained diameter and in so doing pushes the lock-ring back into engagement with the nut to lock the nut against rotation on the spindle.

Under the locked condition of the nut there is relatively little stress exerted against the resilient ring by the annular lock-ring, even in the presence of great vibration and shock, because such forces exerted against the annular ring are not in the direction which stresses the resilient ring to a substantial degree as compared with the relatively great strength which is inherent in a resilient ring of this configuration.

In one embodiment, the washer is provided at a position between its inner periphery and an outer peripheral portion with an annular recess into which the annular lock-ring can extend. From a hub of this washer there extends outwardly into this recess, engaging means which may for example be in the form of serrations and the engaging means of the nut similarly extends outwardly. The engaging means of the lock-ring in this embodiment comprises means at its inner periphery, such as serrations, adapted to engage the corresponding engaging means or serrations of the washer and of the nut to lock the nut. The recess of the washer is provided with an oblique surface slanting from its base and at this recess there is placed the resilient ring at a position such that forward pressure of the lock-ring against the resilient ring pushes the latter against the oblique surface of the recess causing the resilient ring to strain to a different diameter as it is pushed toward the base by the lock-ring. When the resilient ring is thus pushed far enough toward the base the engaging means of the lock-ring becomes disengaged from the engaging means of the nut, permitting turning of the nut. When the forward pressure is released from the lock-ring it is pushed back to engagement with the nut again by action of the resilient ring in returning to its normal unstressed diameter.

In another embodiment of the invention the engaging means of the lock-ring comprises peripheral means adapted to engage with peripheral engaging means of the washer and also comprises means for engaging with the engaging means of the nut.

While a nut locking mechanism of the present invention is particularly suited for use as a wheel bearing nut on the spindle on which the bearing is mounted, it is useful for other applications, such as bolts and studs.

The foregoing and other features of the invention will be better understood from the following detailed description and the accompanying drawings of which:

FIG. 1 shows in cross-section a lock nut assembly according to this invention being fastened by a torquing wrench to a spindle supporting a wheel bearing;

FIG. 2 is a cross-section view of the assembly of FIG. 1 after removal of the torquing wrench, this being the normal locked position;

FIG. 3 shows a view taken at line 3—3 of FIG. 2 but without showing the spindle;

FIG. 4 is a view taken at line 4—4 of FIG. 2, without showing the spindle;

FIG. 5 shows a detail in cross-section taken at line 5—5 of FIG. 4 under the condition that a wrench is applied as in FIG. 1;

FIG. 6 is a face view of a washer member used in the assembly of FIGS. 1 and 2;

FIG. 7 is a face view of an annular ring member used in the assembly of FIGS. 1 and 2;

FIG. 8 is a face view of a nut used in the assembly of FIGS. 1 and 2; and

FIG. 9 shows a resilient snap ring used in the assembly of FIGS. 1 and 2;

FIG. 10 shows in cross-section another form of lock nut assembly according to this invention adapted to be fastened by a torquing wrench to a spindle supporting a wheel bearing;

FIG. 11 is an end view of the assembly of FIG. 10 without the wrench, this view being taken from line 11—11 of FIG. 10;

FIG. 12 is a face view of a washer used in the assembly of FIGS. 10 and 11;

FIG. 13 is a face view of a lock-ring used in the assembly of FIGS. 10 and 11;

FIG. 14 is a cross-section view showing a detail taken at line 14—14 of FIG. 10;

FIG. 15 shows a resilient ring used in the assembly of FIGS. 10 and 11; and

FIG. 16 is a detail view looking from line 16—16 of FIG. 11.

Referring to FIGS. 1 and 2 there is shown part of a spindle 10 on which is mounted a roller bearing assembly 11 fitted within the hub 12 of a wheel, in a well-known manner. A lock nut assembly 13 according to this invention is fitted over and fastened to the rear or outer threaded end 14 of the spindle with a washer member 15 of the assembly abutted against the roller bearing assembly 11. The washer 15 has a central hole 16 dimensioned to fit over the spindle 10 with an inwardly protruding key 17 dimensioned to fit into a keyway or groove 18 formed in the surface of spindle 10 at its outer end and extending parallel to the longitudinal axis 19 of the spindle. The direction along this axis from the threaded end of the spindle toward the wheel bearing is herein referred to as the forward direction, and the opposite direction is herein referred to as the rearward direction. The washer has a forward face placed against the wheel bearing assembly and has a circular outer peripheral portion 20 (seen in FIG. 6) and an inner hub portion 21 adjacent the hole 16. Between the hub and periphery portions there is an annular recess 22 having a base 23 with oblique sidewall portions 24 and 25 which converge toward the base 23, so that oblique portions 24 and 25 slant obliquely outwardly and axially. The outer end of converging wall 25 of the recess joins cylindrical wall portion 26 of the recess, and the outer portion of converging wall 24 connects with an annular ledge 27 which meets hub 21. At the outer periphery of hub 21 there are formed a plurality of serrations 28 protruding radially outward from the hub toward the outer periphery 20. These serrations 28 are sometimes herein referred to as engaging means of the washer, or washer engaging means, since they function to engage with corresponding engaging means of other components as appears hereinafter.

Protruding into the recess 22 there is an annular ring member 29 sometimes herein referred to as a lock-ring or indicating ring. The inside or forward face 30 of this lock-ring, that is the face closest to the bearing 11, is seen in FIG. 7 and its outside, or rear, face 37 and also a peripheral protuberance 38 at its rear face are shown in FIG. 4. The forward face 30 is planar except for an annular recess 31 formed therein, this recess having two sides 32 and 33 which converge toward each other to a base 34, best seen in FIG. 2. There protrude radially inwardly from annular lock-ring 29 a plurality of serrations 35, the inner faces 36 of which lie in the plane 30. The serrations 35 are sometimes herein referred to as engaging means of the lock-ring or lock-ring engaging means. The outer or rear face 37 of the lock-ring extends in a radial direction to meet the outer annular rearwardly extending protuberance 38. The serrations 35 of lock-ring member 29 are proportioned and dimensioned to be able to mesh with the splines or serrations 28 of the washer 15.

Within the recess 22 there is placed a resiliently expandable and contractable snap ring 39, seen in FIG. 9, having a circular cross-section as shown in FIG. 2 and being in the form of an incomplete circle having abutting ends 40 and 41 which normally meet or nearly meet each other. The ring 39 is of resilient material, ordinarily metal, so that the ring is resiliently expandable to a larger circle than that which it has when the ends 40 and 41 abut each other. The diameter of ring 39 is such that in its normal contracted position shown in FIGS. 2 and 9 the circumference of the ring meets the junction of side portion 24 of the recess 22 with ledge 27, while another part of the circumference of ring 39 is in contact with the plane surface 30 of the annular ring member as shown in FIG. 2.

The assembly of washer 15, lock-ring 29 and snap ring 39 are held together against separation by swaging an annular lip 44 at the inner surface of the outer end of peripheral member 20 of the washer 15, so that the lip overlies a peripheral part of annular ring member

29.

A nut 45, shown as a hex nut having internal threads 46 is adapted to be threaded over the outer end of spindle 10 so that its inner or forward face 47 abuts the outer or rear face of washer 15. The inner face of the nut is shown in FIG. 8 and its outer face appears in FIG. 4. The portion of the inner or forward face 47 which meets washer 15 is shouldered at 48 and from this shoulder there extend radially outward a plurality of serrations 49, herein sometimes referred to as engaging means of the nut or nut-engaging means, dimensioned so that they can mesh with the serrations 35 of annular lock-ring 29, that is, serrations 49 are of substantially the same size and dimensions as serrations 28 of washer 15. At the rearward side of serrations 49, that is, at a rear portion of the nut, there is formed the hexagonal wrench engaging portion 50 of the nut.

The nut 45 is held to the above-mentioned assembly of washer 15, lock-ring 29 and snap ring 39 by means of a spring member 51 which is in the form of a resilient strip bent so that one end 52 can be fitted to a shoulder 53 at the outside surface of the nut while the remainder of the spring member extends radially inwardly along the outside face of the nut to a position within the threads of the nut coinciding with the keyway 18 of the spindle where it bends to extend longitudinally within the keyway and through a longitudinal groove 54, best seen in FIG. 6, of key 17 forward of the inner face of the washer where the spring bends at 55 where its end 56 enters into and engages a transverse recess 57 of key 17 as is best seen in FIG. 3. When assembled in this manner the spring 51 is tensioned sufficiently to hold the nut against the washer in the manner shown in FIG. 2.

When it is desired to apply this lock nut assembly to a spindle the washer 15 is slipped over the threaded rear or outer end of the spindle, which will require that the key 17 enter keyway 18 of the spindle, which will provide space for the spring member 51. When the nut 45 reaches the end thread of the spindle the nut will be turned which can readily be done without disturbing the spring 51, by reason of the fact that the spring end 52 rides on the rear face of the hex portion of the nut and is retained against the hex portion by reason of a bevelled annular portion 58 at the rear face of the nut.

It is noted that in the normal position of the assembled parts, as shown in FIG. 2, it is not possible to turn the nut relative to the spindle or to any of the other parts of the lock nut assembly. The reason for this is apparent from the foregoing description of the assembly, namely, that the washer 15 is keyed to the spindle while the serrations 35 of the lock-ring 29 are in mesh with both the washer serrations 28 and the serrations 49 of the nut, all of which is shown in FIG. 2. Thus in the normal locked condition only part of the lock-ring engaging means 35 engages the washer while another part of engaging means 35 engages the nut. In order to permit turning of the nut on the spindle it is necessary to disengage the serrations 35 of the lock-ring 29 from the serrations 49 of the nut. This can be done by forcing the lock-ring 29 forward, that is, toward the bearing on the spindle as is illustrated in FIGS. 1 and 5. This action causes the snap ring 39 to be pushed toward the base 23 of the recess 22 attended by the enlargement of the diameter of snap ring 39 and the consequent enlargement of the gap between its ends 40 and 41. When the snap ring 39 has been pushed all the way to the base 23 as shown in FIGS. 1 and 5, the snap ring is in its tensioned condition and the serrations 35 of annular ring member 29 have become disengaged from the serrations of the nut because they have moved so that they do not extend rearward as far as the serrations 49 of the nut, although serrations 35 remain in engagement with serrations 28 of the washer. When this condition exists, the nut can be turned on the spindle while the washer and lock-ring are held fixed relative to the spindle. This turning of the nut can be accomplished by use of a hollow-ended socket wrench 60 dimensioned to fit the nut. Since the particular nut illustrated herein has a hexagonal form the wrench will be in the form of a hex wrench, and it will have a handle 61.

The peripheral portion 62 of the wrench is dimensioned to engage the protuberance 38 of the lock-ring and thereby force the snap ring 39 to the base 23 of the recess as illustrated in FIGS. 1 and 5, and when the snap ring is thus pushed into the recess the wrench can torque the nut at the same time it is holding the snap ring at the base. When the torquing of the nut has been completed, withdrawal of the wrench will release the pressure against the lock-ring so that the resilience of the snap ring will contract its diameter causing the snap ring to slide outward along surface 24 of the recess, thereby pushing the lock-ring 29 rearward so that its serrations engage the serrations of the nut while also remaining in engagement with the serrations of the washer as shown in FIG. 2. Under this condition the nut has been locked in position and cannot be loosened on the spindle until the snap ring is again pressured into the base of the recess.

The annular ring member 29 is provided with radial markings 63 as its rearwardly extending protuberance 38, as seen in FIG. 4, these markings being located opposite the trough of each of its serrations 35 so as to be a visible indication when the elements are assembled, of the positions of these troughs. Hence ring member 29 may be referred to as an indicator ring as well as a lock-ring. The rear face of the nut 45 is provided with a marking such as a notch 64 to indicate the position of the peak of one of its serrations 49. Since the peaks of the serrations of the nut must enter the troughs of respective serrations of the indicator ring 29, the locking of the nut to the indicator ring must leave the nut marking 64 in registration with one of the indicator ring markings 63. Thus, the markings 63 and 64 are an aid in locking the nut.

There is no particular number of serrations on the indicator ring 29 and nut which must be used. It will be convenient, however, to use 50 serrations when using a 20-pitch thread because in that case one revolution of the nut results in 0.001 inch of longitudinal travel of the nut. When 50 serrations are used for the nut and for the indicator ring, it will be convenient to apply numerals to the markings 63 in multiples of five from 5 to 50, thus number 5 at the fifth marking, number 10 at the tenth marking, and so on to number 50. This will aid in resetting the lock nut to a specific registration if the lock nut has to be removed and later reinstalled.

In the case of wheel bearing nuts, particularly for use on automobiles, it is customary to fit the nut to the spindle at a factory. A good practice is to torque the nut until the pressure against the roller bearing commences to bind the wheel while still allowing the wheel to rotate. After rotating the wheel under this condition for a few turns the nut is backed off slightly, sufficient to free the binding condition and at this point is locked to the indicator ring. When the nut is locked up at any particular desired position, the marker or notch 64 may then be applied in such position on the nut that the marker points in any position of the circle. It will be convenient to select the position of the marker or notch 64 so that it points to any radial marking 63 numbered 5 or a multiple of 5 up to 50, where there are 50 serrations and hence 50 radial markings 63. Thus the correlation of the notch 64 with the same radial marking 63 may be easily re-established if the nut has to be disassembled for service and then reassembled to the same pre-established relationship.

Referring to the embodiment of FIGS. 10 through 16 there is shown part of a spindle 70 on which is mounted a roller bearing assembly 71 fitted within the hub 72 of a wheel, these parts corresponding to the parts numbered 10, 11 and 12 respectively in FIGS. 1 and 2. A lock nut assembly 73 is fitted over and fastened to the outer threaded end 74 of the spindle with the forward face 110 of a washer 75 of the assembly abutted against the roller bearing assembly 71. The washer 75 has a central hole 76 dimensioned to fit over the spindle 70 with an inwardly protruding key 77 dimensioned to fit into a keyway or groove 78 formed in the surface of spindle 70 at its rear end and extending parallel to the longitudinal axis 79 of the spindle. The washer has a circular peripheral portion 80 and an inner or hub portion 81 adjacent the hole 76. The peripheral portion 80 of the washer has an axial and outward slant since it slants obliquely outwardly relative to the axis 79 with a rearward component in the axial direction, to an outer circular position 82 at the rear surface of the washer. Owing to the oblique slant of the portion 80 and the thickness of the washer, its forward surface extends further outward to a position 82a. The outer peripheral portion 80 is provided with a number of cut-outs or openings 83 uniformly spaced around the periphery, as best seen in FIG. 12. These cutouts or openings are herein sometimes referred to as washer-engaging means.

Rearward of washer 75 there is an annular ring member 89 herein referred to as a lock-ring. This lock-ring has a hub portion 85 which extends radially outward from its central opening for a distance where it meets an oblique portion 86 which slants radially outward and forward to an outer diameter where it meets a plurality of spaced lugs 87 which protrude forwardly toward the wheel bearing. The dimensions of the lock ring 89 and the number and position of its lugs are such that the lugs protrude through the openings 83 of the washer as appears in FIGS. 10 and 11. The inner periphery of the lock-ring 89 is provided with inwardly protruding serrations 88. The lugs 87 and the serrations 88 of the lock-ring member 89 are herein collectively referred to as lock-ring engaging means because part of this last-mentioned means (the lugs 87) engages the washer-engaging means (the cutouts 83) and the other part engages a nut engaging means as is explained below.

The nut 90 to be locked, shown as a hex-nut having internal threads 91, is adapted to be threaded over the rear end of spindle 70 so that its forward face 92 abuts the rear face 110 of washer 75. Rearward of face 92 the nut is provided with a shoulder 93, and the portion 94 of the nut between the shoulder 93 and forward face 92 is in the form of an annulus. Behind the shoulder 93 the nut enlarges to a diameter 95 somewhat larger than the diameter 94, and rearward of section 95 the nut has its hexagonal form 96 for being gripped by a hex-wrench. At the forward side of the shoulder 93 of the nut there extend radially outward a plurality of serrations 97, herein sometimes referred to as the nut-engaging means, dimensioned and placed to engage part of the lock-ring engaging means, namely the serrations 88 of the lock-ring which is placed over the forward annulus of the nut.

It is seen that there is an annular space or area 98 around the forward annulus of the nut and between the juxtaposed, but spaced apart, near surface 111 of washer 75 and forward surface 112 of lock-ring 89. Within this annular space 98 there is placed a resiliently contractable ring 100, illustrated in FIG. 15, having a circular cross-section as shown in FIG. 10 and being in the form of a incomplete circle having ends 101 and 102 which in the normal unstrained condition are spaced somewhat apart from each other. The ring 100 is of resilient material, ordinarily metal, so that when it is forcibly contracted to a smaller circle than normal it is resiliently expandable to a larger circle than that which it has when the ends 101 and 102 are forced into contact with each other in abutment. The diameter of ring 100 is such that in its normal unstrained expanded condition shown in FIGS. 10 and 15 the circumference of the ring is substantially in contact with the inner walls of the oblique portions 80 and 86 of the washer and lock-ring respectively as shown in FIG. 10.

Provision is made for holding together the assembly of the washer, lock-ring and nut with the resilient ring in the region between the washer and the lock-ring. This can be done by first placing the lock-ring over the forward portion 94 of the nut as shown in FIG. 10 and then swaging the nut at the outer periphery near its forward end to upset the material of the nut as shown at 103. This swaging or upsetting may be made completely peripherally around the nut or alternatively at a number of spaced places. This will serve to prevent the lock-ring from slipping forward off the nut. It cannot slip backward off the nut because the rear surface of portion 96 of the lock-ring abuts shoulder 93 of the nut. After placing the resilient ring 100 in its position shown in FIG. 10 the washer can be engaged to the lock-ring as shown in FIGS. 10 and 11 following which tabs 104 on the lugs 87 of the lock-ring are bent inwardly to overly the forward surface at the periphery of the washer as best seen in FIGS. 10 and 16. It is noted that in FIGS. 11 and 13 the lugs of the lock-ring are illustrated prior to the bending down of tabs 104.

When it is desired to apply the lock nut assembly of FIGS. 10 through 16 to a spindle the assembly is slipped forwardly over the threaded rear end of the spindle with the washer at the forward end of the assembly. This will require that the key 77 enter the keyway 78 of the spindle. When the nut reaches the end thread of the spindle the nut will be turned, ordinarily by a special torquing tool. In order to turn the nut on the spindle the lock-ring will have to be pushed forwardly relative to its position shown in FIG. 10, far enough so that its serrations 88 become disengaged from the serrations 97 of the nut. This pressure on the lock-ring is exerted against the resilient ring and owing to the oblique positions of the lock-ring and the washer at their places of contact with the resilient ring above the center of the resilient ring, the resilient ring is forced to resiliently contract in diameter as the lock-ring moves forward relative to the washer, and the sidewall of the resilient ring slides inwardly in contact with the slanting walls of the lock-ring and washer.

When the lock-ring is pushed forward far enough to disengage its serrations from those of the nut, the nut can be turned on the spindle and tightened up against the rear face 111 of the washer as shown in FIG. 10. Then when pressure on the lock-ring is released the force of expansion of the resilient ring back to its normal larger diameter will cause the lock-ring to slide rearwardly relative to the washer until its hub portion engages the shoulder 93 of the nut, in which position the serrations of the lock-ring and of the nut are again in engagement which prevents the nut from turning on the spindle, due to the fact that the lugs of the lock-ring hold the lock ring and nut from rotation relative to the washer, which is keyed to the spindle.

The means for pressuring the lock-ring and turning the nut can be accomplished by use of a hollow ended socket wrench 105 dimensioned to fit the nut and engage the lock-ring. Since the particular nut illustrated herein has a hexagonal form, the wrench will be in the form of a hex-wrench ordinarily provided with a handle (not shown).

The rear face of the lock-ring such as at the hub portion 85 may if desired, be provided with radial markings such as markings 63 shown in FIGS. 2 and 4, and for the same reason. These would be located opposite the trough of each of its serrations 88 so that the lock-ring may serve as an indicator ring. Similarly an exposed surface at the rear of the nut may be provided with a marking such as the notch 64 shown in FIG. 4 and for the same reason, namely to aid in locking the nut at a desired position.

It will be recognized that by the present invention there is provided mechanism for positively locking a nut so that it will not loosen in the presence of shocks, vibration and other disturbances. The arrangement is foolproof in that the resilient element maintaining the locked condition is unstrained and in a state of rest when in the locked position. Any shocks to which the resilient element is subjected are not in a direction which readily strains it, and moreover, its structure is such that it is inherently strong and resistant to damage from shock. The arrangement is particularly adapted to use as a wheel-bearing nut, but its uses are not so limited. It is applicable for use on bolts and studs in various circumstances where nuts and bolts are used. The term "spindle" as used herein is not limited to a wheel axle spindle, or the like, but more broadly covers various threaded elements such as bolts on which nuts may be threaded.

It will be understood that the embodiments of the invention illustrated and described herein are given by way of illustration and not of limitation, and that modifications or equivalents or alternatives within the scope of the invention may suggest themselves to those skilled in the art.

We claim:

1. Mechanism for locking a nut on a threaded spindle having a central longitudinal axis, comprising:
    a washer member adapted to fit over said spindle, having a rear face and washer engaging means;
    means for keying said washer member to said spindle so that the washer member cannot rotate but can slide axially relative to said spindle;
    a lock-ring member having a forward face rearward of, and spaced from, and facing, said rear face of said washer member, so that there is an annular space between the lock-ring member and the washer member said lock-ring member having lock-ring engaging means at least part of which engages said washer engaging means;
    at least one of said washer and lock-ring members having a portion bordering said annular space which is slanted obliquely radially and axially;
    a threaded nut adapted to thread on the threaded spindle, having a rear portion for engagement by a wrench and an annular forward portion protruding forwardly from the rear portion to a position between the spindle and at least part of the lock-ring member and adapted to abut the washer member, said forward portion having nut engaging means extending radially outward and adapted to engage at least part of said lock-ring engaging means,
    a resiliently strainable ring whose diameter can be enlarged and contracted, within said annular space and adapted to engage said obliquely slanted portion;
    whereby when pressure is applied to the lock-ring member in the forward direction the lock-ring member moves axially forward to disengage its lock-ring engaging means from said nut engaging means and the diameter of the strainable ring is altered by camming action on the obliquely slanted portion, whereupon the nut can be turned on the spindle, and when said pressure is released the strainable ring returns to its normal unstrained diameter and pushes the lock-ring member rearwardly to a position where the lock-ring engaging means engages the nut engaging means, thereby locking the nut.

2. Mechanism according to claim 1 in which said one of said washer and lock-ring members is said washer member.

3. Mechanism according to claim 1 in which both the lock-ring member and the washer member have portions bordering said annular space, which slant obliquely radially and axially.

4. Mechanism according to claim 1 in which the cross-section of the resiliently strainable ring is circular.

5. Mechanism for locking a nut on a threaded spindle having a central longitudinal axis, comprising:
    a washer adapted to fit over said spindle, having an outer portion provided with washer-engaging means;
    means for keying said washer to said spindle so that the washer cannot rotate but can slide axially relative to said spindle;
    a lock-ring having a forward face rearward of, and spaced from said washer, said forward face having an inner hub portion adapted to be placed around said spindle behind the washer and having an outer portion provided with a first portion of a lock-ring engaging means; said hub portion having a second portion of said lock-ring engaging means extending radially inward;
    at least one of said outer portions slanting obliquely outward, and toward, and meeting, the other outer portion so that said washer-engaging means engages said first portion of the lock-ring engaging means;
    a threaded nut adapted to thread on the threaded spindle and having a forward portion comprising an annulus around the spindle and within the hub of the lock-ring and adapted to abut the washer, and having nut engaging means extending radially outward and adapted to engage said second portion of said lock-ring engaging means, there being an annular space between the lock-ring and the washer located radially inward from the position of engagement of the washer engaging means with said first portion of the lock-ring engaging means and radially outward from the hub of the nut;

a resiliently strainable ring whose diameter can be enlarged and contracted, within said annular space;

whereby when pressure is applied to the lock-ring in the forward direction the lock-ring moves axially forward to disengage said second portion of the lock-ring engaging means and the diameter of the strainable ring is contracted by camming action from said obliquely slanted portions, whereupon the nut can be turned on the spindle, and when said pressure is released the strainable ring returns to its normal larger diameter and pushes the lock-ring rearwardly to a position where said second portion of the lock-ring engaging means engages the nut engaging means, thereby locking the nut.

6. Mechanism according to claim 5 in which both of said outer portions slant obliquely and axially.

7. Mechanism according to claim 6 in which the axial slant of said outer portion of the washer is rearward and the axial slant of the outer portion of the lock-ring is forward.

8. Mechansim according to claim 7 in which the engaging means of the washer comprises indents and said first portion of the engaging means of the lock-ring comprises lugs.

9. Mechanism according to claim 5 in which the resilient ring engages said outer portions of the lock-ring and of the washer.

10. Mechanism according to claim 7 in which the resilient ring engages the forward slanting outer surface of the lock-ring and the rearward slanting outer surface of the washer.

11. Mechanism according to claim 5 in which a portion of the nut forward of the lock-ring is provided with means preventing the lock-ring from becoming disassembled from the nut when the nut is removed from the spindle.

12. Mechanism according to claim 11 in which said means preventing the lock-ring from becoming disassembled from the nut is at a distance forward of the hub portion of the lock-ring, permitting the lock-ring to be pushed forwardly from its rearmost position on the nut regardless of whether the nut is abutted to the washer.

13. Mechanism according to claim 5 in which the engaging means of at least one of said washer and lock-ring is provided with means preventing disengagement of said first portion of the lock-ring engaging means from the washer engaging means.

14. Mechanism according to claim 11 in which said means preventing the lock-ring from becoming disassembled from the nut is on the nut at a distance forward of the hub of the lock-ring when the lock-ring is in its rearmost position on the nut, thereby permitting the lock-ring to be pushed forwardly from its rearmost position on the nut regardless of whether the nut is abutted to the washer, and in which the engaging means of at least one of said washer and lock-ring is provided with means preventing disengagement of the lock-ring engaging means from the washer engaging means.

15. Mechanism according to claim 5 in which said second portion of the engaging means of the washer comprises radially inwardly directed splines and the engaging means of the nut comprises radially outwardly directed splines adapted adapted to engage the inwardly directed splines of the washer.

16. Mechanism according to claim 15 in which a rear part of the lock-ring contains markings opposite respective ones of said splines of the annular lock-ring to show the location of the last-mentioned splines.

17. Mechanism according to claim 16 in which a rear part of the nut contains a marking to indicate when the splines of the nut are in registration with the splines of the annular lock-ring.

* * * * *